(12) United States Patent
Lee et al.

(10) Patent No.: US 9,786,132 B2
(45) Date of Patent: Oct. 10, 2017

(54) DISPLAY FOR AUTOMATED TELLER MACHINE AND METHOD FOR DEPOSITING MONEY IN A PLURALITY OF ACCOUNTS BY USING SAME

(71) Applicant: Nautilus Hyosung Inc., Seoul (KR)

(72) Inventors: Hoon Lee, Gyeonggi-do (KR); Yoo Mee Min, Gyeonggi-do (KR)

(73) Assignee: NAUTILUS HYOSUNG INC., Seoul (KR)

( * ) Notice: Subject to any disclaimer, the term of this patent is extended or adjusted under 35 U.S.C. 154(b) by 12 days.

(21) Appl. No.: 15/042,199

(22) Filed: Feb. 12, 2016

(65) Prior Publication Data
US 2017/0039818 A1   Feb. 9, 2017

(30) Foreign Application Priority Data

Aug. 5, 2015  (KR) ................ 10-2015-0110616

(51) Int. Cl.
*G07F 19/00*  (2006.01)
*G06Q 20/10*  (2012.01)

(52) U.S. Cl.
CPC ............ *G07F 19/202* (2013.01); *G07F 19/20* (2013.01); *G06Q 20/1085* (2013.01)

(58) Field of Classification Search
CPC .... G07F 19/20; G07F 19/202; G06C 20/1085
USPC .......................................... 235/379
See application file for complete search history.

(56) References Cited

U.S. PATENT DOCUMENTS

| | | | | |
|---|---|---|---|---|
| 6,811,078 B2* | 11/2004 | Workens | ................ | G06Q 20/10 235/375 |
| 7,610,229 B1* | 10/2009 | Kornegay | ............ | G06Q 20/102 705/35 |
| 8,346,640 B1* | 1/2013 | Sanders | ............... | G06Q 20/102 235/376 |
| 2002/0001393 A1* | 1/2002 | Jones | ................ | G06K 9/00979 382/100 |
| 2003/0046234 A1* | 3/2003 | Takadachi | .......... | G06Q 20/1085 705/43 |
| 2008/0140551 A1* | 6/2008 | Savage | .................. | G06Q 20/18 705/35 |
| 2009/0153737 A1* | 6/2009 | Glen | ..................... | G09G 5/006 348/571 |
| 2012/0310810 A1* | 12/2012 | Downs, II | ............. | G06Q 40/04 705/37 |
| 2014/0336838 A1* | 11/2014 | Yon | ..................... | G01R 21/133 700/297 |
| 2015/0149963 A1 | 5/2015 | Chang et al. | | |
| 2016/0070581 A1* | 3/2016 | Soon-Shiong | ......... | G06Q 50/10 715/706 |

FOREIGN PATENT DOCUMENTS

JP   2012185551 A  *  9/2012
KR   10-2015-0061484 A    6/2015

* cited by examiner

*Primary Examiner* — Claude J Brown
(74) *Attorney, Agent, or Firm* — Bacon & Thomas, PLLC

(57) ABSTRACT

In accordance with an embodiment of the above mentioned present disclosure, a display for an automated teller machine includes an amount display unit configured to display a total amount to be deposited in a plurality of accounts, an account selection unit configured to allow a user to select an account among the plurality of accounts and an amount entry unit configured to allow the user to set an amount and deposit the amount in the selected account.

10 Claims, 8 Drawing Sheets

DISPLAY FOR AUTOMATED TELLER MACHINE AND METHOD FOR DEPOSITING MONEY IN A PLURALITY OF ACCOUNTS BY USING SAME

CROSS-REFERENCE TO RELATED APPLICATIONS

This application is based on and claims priority to Korean Patent Application No. 10-2015-0110616, filed on Aug. 5, 2015, the disclosure of which is incorporated herein in its entirety by reference.

TECHNICAL FIELD

The present disclosure relates to a display for an automated teller machine (ATM) and a method for depositing money in a plurality of accounts.

BACKGROUND

In general, an automated teller machine ("ATM") is provided to enable a user to perform financial transactions for user's financial accounts, such as deposits, withdrawals and transfers. Hereinafter, there will be described the deposits that a user distributively deposits money in his/her accounts, among aforementioned transactions.

The user selects any one account among a plurality of his/her accounts. The user enters an amount to be deposited in the selected account. To this end, the ATM displays each of the plurality of accounts on a display, provides an interface which allows the user to select one account among the plurality of accounts and provides an interface which allows the user to input an amount to be deposited in the selected account. Further, the ATM displays a balance that is an amount obtained by subtracting the amount already assigned to be deposited in the selected account from a total amount that the user would deposit.

In this case, for in a conventional ATM, the interface for the user's selection of an account, the interface for the user's input of an amount and the interface for displaying the balance are composed of just text. Thus, there is a need for an ATM providing a more intuitive interface.

SUMMARY

In view of the above, the present disclosure provides a device and a method for providing a more intuitive interface than conventional interfaces to an user in the process for distributively depositing money in a plurality of accounts of the user.

The objects of the present disclosure are not limited thereto, but and other objects that are not described above will be apparent to those skilled in the art from the following description.

In accordance with an embodiment of the above mentioned present disclosure, a display for an automated teller machine includes; an amount display unit, an account selection unit and an amount entry unit. The amount display unit displays a total amount to be deposited in a plurality of accounts. The account selection unit allows a user to select an account among the plurality of accounts. The amount entry unit allows the user to input an amount to be deposited in the selected account. The amount display unit displays a balance that is an amount obtained by subtracting the amount already assigned to be deposited in the selected account.

In accordance with an embodiment of the above mentioned present disclosure, a method for depositing money in a plurality of accounts using an automated teller machine includes displaying a total amount to be deposited in the plurality of accounts. The method also includes allowing a user to select an account among the plurality of accounts. The method also includes allowing the user to input an input for an amount to be deposited in the selected account. The method also includes displaying a balance that is amount obtained by subtracting the amount already assigned to be deposited in the selected account from the total amount.

According to the embodiments of the present disclosure, an intuitive interface can be provided to an user in a process for distributively depositing money in a plurality of accounts. Further, the user can more intuitively recognize a balance that is an amount already assigned to be deposited in a selected account from the total amount which the user would deposit. In addition, the user can more conveniently designate the balance as an amount to be deposited than in conventional manners.

DETAILED DESCRIPTION OF THE EMBODIMENTS

The advantages and features of exemplary embodiments of the present disclosure and methods of accomplishing them will be clearly understood from the following description of the embodiments taken in conjunction with the accompanying drawings. However, the present disclosure is not limited to those embodiments and may be implemented in various forms.

In the following description, well-known functions and/or configurations will not be described in detail if they would unnecessarily obscure the features of the disclosure in unnecessary detail. Further, the terms to be described below are defined in consideration of their functions in the embodiments of the disclosure and may vary depending on a user's or operator's intention or practice. Accordingly, the definition may be made on a basis of the content throughout the specification.

Before describing the present disclosure, the term of transaction used herein may be widely interpreted as a comprehensive concept including all financial transactions, for example, deposits, withdrawals, transfers, and balance check for user's account through an ATM (Automated Teller Machine).

Figure 1:
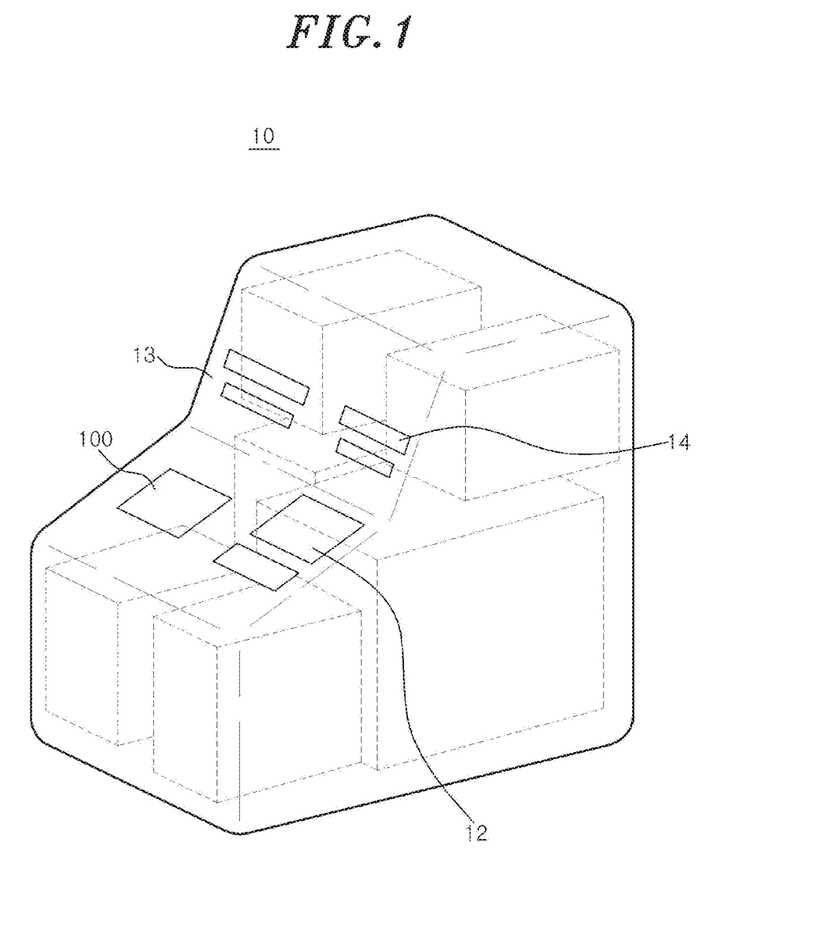
FIG. 1 shows an exemplary ATM in accordance with at least one embodiment of the present disclosure.

FIG. 1 shows an exemplary ATM in accordance with at least one embodiment of the present disclosure.

The ATM 10 is a device for enabling users to perform cash deposits and withdrawals through a financial computer network (not shown). The ATM 10 supports a user to deposit cash distributively in a plurality of accounts.

Meanwhile, the ATM 10 may include a general cash deposit and withdrawal device, a cash dispenser for cash withdrawal or an automated multi-function device for providing financial services. In addition, the ATM 10 may be a device including an unattended automated device, for example, an unattended terminal (KIOSK) for providing additional services including bill payment, ticketing or point earning.

Referring to FIG. 1, the ATM 10 may include a cash deposit and withdrawal unit 12, a bankbook unit 13, a card reader 14, and a display 100. The ATM 10 shown in FIG. 1 is just an example, and it may include other components or may not include one or more of the components shown in FIG. 1.

The cash deposit and withdrawal unit 12 receives, dispenses, counts or stores cash. The bankbook unit 13 reads bankbooks and prints details of transactions therein.

When a user inserts a card for financial transactions in the card reader 14, the card reader 14 reads the user's card and performs tasks related to the financial transactions. The card reader 14 may read cards for financial transactions, such as credit cards and cash cards and rewards cards or identity cards for other tasks.

In addition, the ATM 10 may further include a communication unit for connection with a server, a control unit for controlling overall operation of the ATM 10, a memory for storing data or a printer for printing details of financial transactions on bankbooks or paper receipts, all of which are not shown.

The display 100 provides to users a GUI (Graphic User Interface) for financial services or additional services.

The display 100 may be, for example, any one of a touch screen type, a button type, or a combination thereof. Further, the display 100 includes at least one of processors implementing an account selection unit 110, an amount entry unit 130, an amount display unit 150 and a balance designation unit 170 to be described hereinafter. Configuration and function of the display 100 are described hereinafter in more detail.

Figure 2:
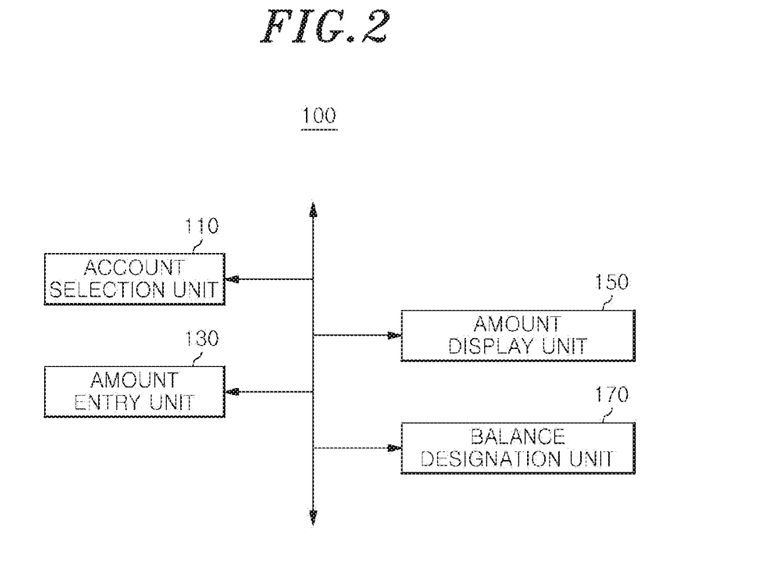
FIG. 2 shows a configuration of a display included in the ATM in accordance with at least one embodiment of the present disclosure.

FIG. 2 shows a configuration of the display 100 included in the ATM 10.

Referring to FIG. 2, the display 100 includes an account selection unit 110, an amount entry unit 130 and an amount display unit 150. The display 100 is merely an example, and the display 100 may not include one or more of the aforementioned components or may further include other components. For example, the display 100 may further include a balance designation unit 170.

The account selection unit 110 displays the plurality of accounts by using account display windows corresponding to the accounts. In this case, each of the plurality of accounts may be identified by information such as an account number or currently balance of each account.

Through the account selection unit 110, the user selects an account, among the plurality of accounts, in which a part or all of a total amount that the user would deposit.

The amount entry unit 130 allows the user to input an amount to be deposited in the selected account. To this end, the amount entry unit 130 may include an input device, for example, a keypad composed of numerals or buttons for selecting a specified amount ($1, $5, $10, $100, ₩10,000, ₩50,000, ₩100,000, etc.), through which the user inputs an amount to be deposited.

The amount display unit 150 displays the total amount to be deposited in the plurality of accounts and a balance that is an amount obtained by subtracting the amount already assigned to be deposited in the selected account or accounts from the total amount.

In this case, the amount display unit 150 may display the total amount and a ratio of the balance to the total amount using a figure such as a bar or the like. For example, the total amount may be displayed as an entire area of the figure, and the ratio of the balance to the total amount may be displayed in a manner to divide the figure into a first area and a second area, a ratio of the first area to sum of the first area and the second area being equal to the ratio of the balance to the total amount, for example with colors or shades lines.

In this case, since the bar figure is merely an example, the scope of the present disclosure is not limited thereto. For example, the figure may be one of various figures such as a circle, a square and an ellipse.

The balance designation unit 170 may be used to designate the current balance as an amount to be deposited in a specified account. That is, the user may designate the current balance by selecting the balance designation unit 170 instead of entering the amount of the current balance through the amount entry unit 130. For example, if the balance of a total amount $3,000 is $253 and the user wants to deposit the balance of $253 in a first account, the user may select the balance designation unit 170 to designate $253 as an amount to be deposited in the first account.

Figure 3:
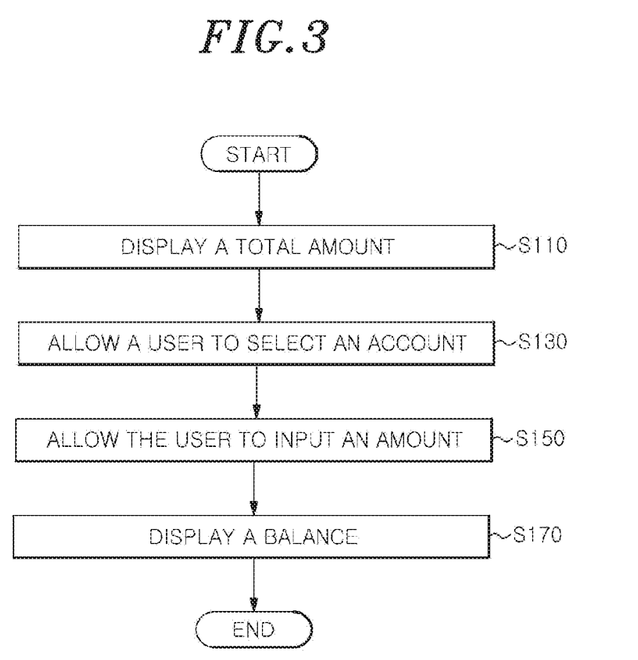
FIG. 3 shows a process for depositing money in a plurality of accounts in accordance with at least one embodiment of the present disclosure.

FIG. 3 shows a process for depositing money in a plurality of accounts in accordance with at least one embodiment of the present disclosure.

The method for depositing money in the plurality of accounts may be performed in the ATM 10 including the display 100 shown in FIGS. 1 and 2.

Referring to FIG. 3, the method for depositing money in the plurality of accounts may include displaying a total amount (S110) to be deposited in the plurality of accounts, allowing a user to select an account (S130) among the plurality of accounts, allowing the user to input an input for an amount (S150) to be deposited in the selected account and displaying a balance (S170) that is amount obtained by subtracting the amount already assigned to be deposited in the selected account from the total amount.

The operations and effects in accordance with an embodiment of the present disclosure will be described hereinafter with reference to FIGS. 4 to 8. FIGS. 4 to 8 show exemplary processes for depositing money in the plurality of accounts performed in the ATM 10 including the display 100. Although the processes may be performed in order from FIG. 4 to FIG. 8, this is an example. Therefore, the processes may be performed in a different order. In addition, any one of the processes may be omitted or an additional process may be performed.

Figure 4:
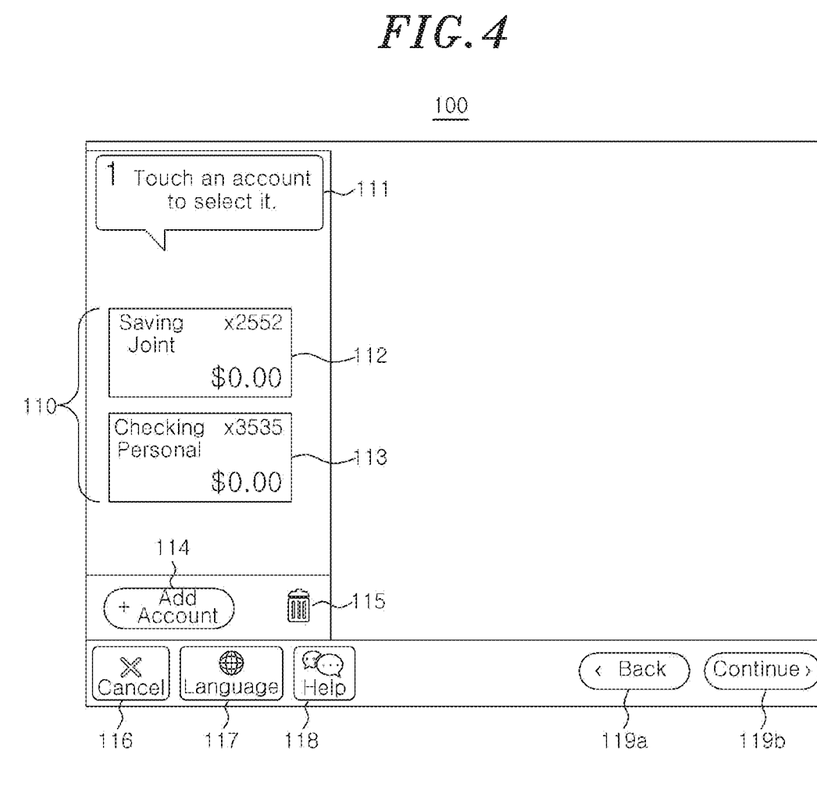
FIGS. 4 to 8 show exemplary interfaces provided to a user who deposits money the plurality of accounts in accordance with at least one embodiment of the present disclosure.

FIG. 4 shows an exemplary screen, in the display 100, for selecting any one from the plurality of accounts.

Referring to FIG. 4, the display 100 displays a message 111 to guide the user to select any one from the plurality of accounts related the user.

The display 100 displays the account selection unit 110. The user may select any one from the plurality of accounts through the account selection unit 110. In this case, the account selection unit 110 may include account display windows 112, 113 each of which corresponds to each of the plurality of accounts. Each of the account display windows 112,113 may display information to identify each of the accounts or information about the amount deposited in each account. The user may touch one of the account display windows 112, 113 to select any one from the plurality of accounts. That is, the user may more intuitively select any one from the plurality of accounts using the account display windows than in conventional manners for selection of accounts.

Meanwhile, as shown in FIG. 4, the display 100 may display an account addition unit 114 for adding an account, and an account deletion unit 115 for deleting any one of the accounts.

In addition, the display 100 may include a cancellation unit 116 for cancelling the process for depositing money in the plurality of accounts, a language change unit 117 for changing the language displayed on the display 100, a help unit 118 for giving an advice to the user, and process selection units 119a, 119b for advancing to a next operation or a previous operation in the process for depositing money in the plurality of accounts.

Figure 5:
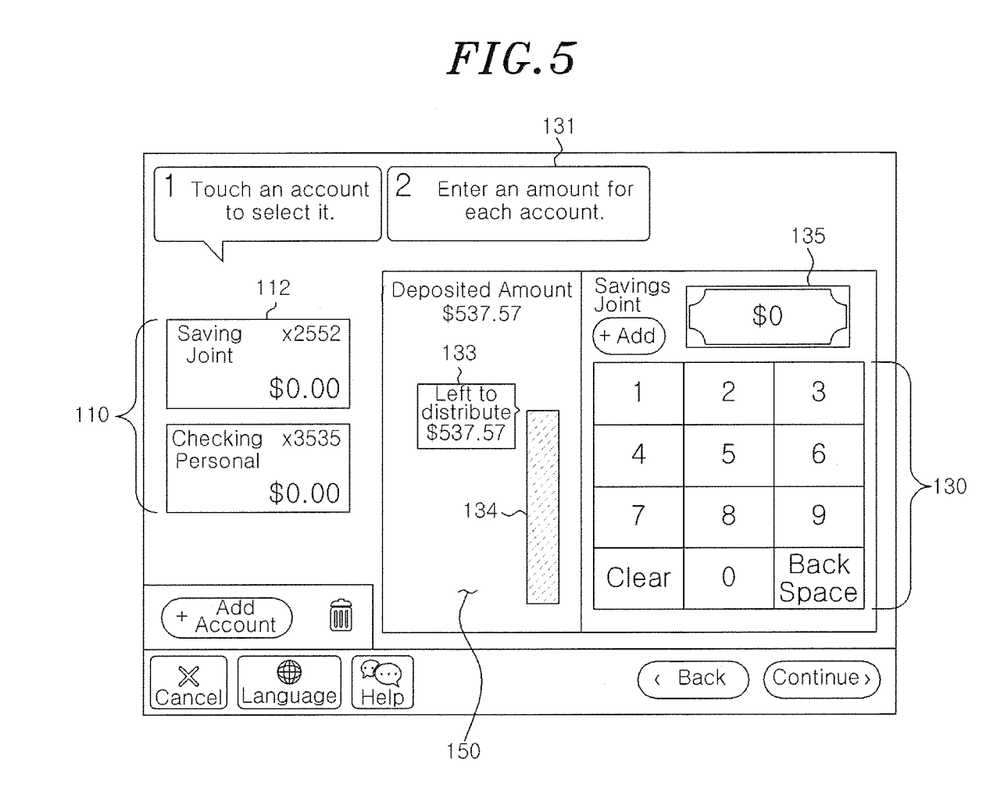

FIG. 5 shows an exemplary screen for allowing the user to input an amount to be deposited in an account selected by the user.

Referring to FIG. 5, the user may select an account corresponding to the account display window 112 from the plurality of accounts, for example, two accounts.

The display 100 then displays a message 131 for prompting the user to enter an amount to be deposited in the selected account.

The display 100 displays the amount entry unit 130 to enable the user to enter the amount to be deposited in the selected account. The amount entry unit 130 provides an interface to allow the user to enter the amount. The interface shown in FIG. 5 may be, for example, a keypad, but it is not limited thereto. In addition, the amount entry unit 130 may display an amount entered by the user in an amount indicating section 135.

The amount display unit 150 displays the total amount to be deposited in the plurality of accounts by using a FIG. 134 such as a bar.

In addition, the amount display unit 150 may further include a balance display 133 for displaying a balance that is an amount obtained by subtracting the amount already assigned to be deposited in the selected account from the total amount. Because FIG. 5 shows the state before the amount to be deposited in the selected account is entered, the balance in the balance display 133 is shown the same as the total amount.

Figure 6:
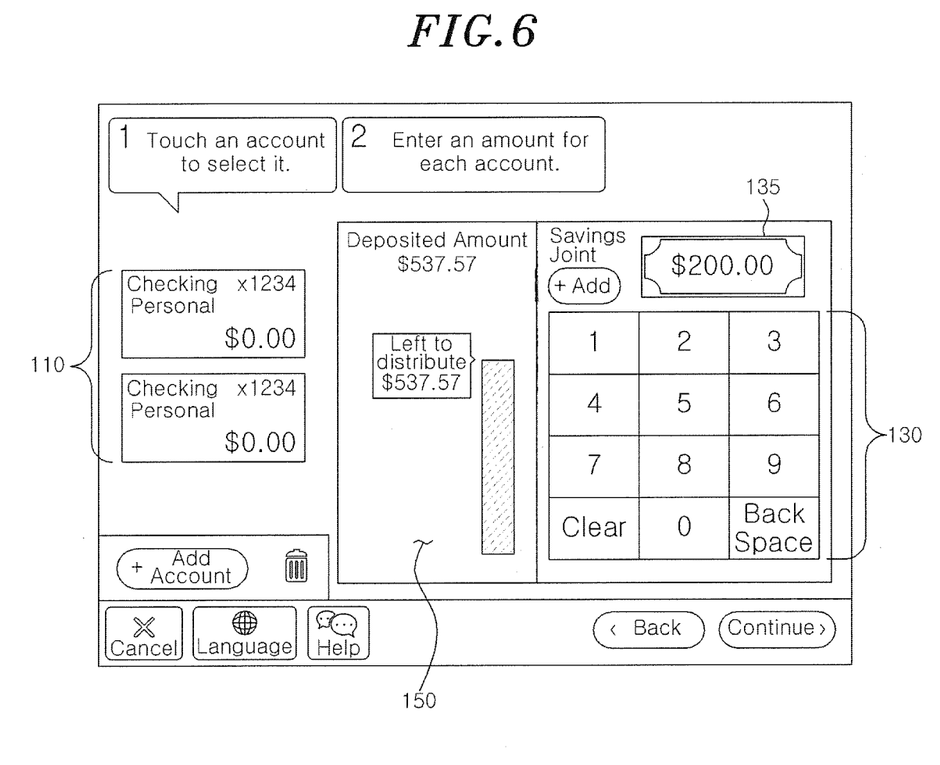

FIG. 6 shows an exemplary screen that displays a state in which an amount to be deposited in the selected account is entered. Referring to FIG. 6, the amount entered by the user is displayed in the amount indicating section 135 of the amount entry unit 130.

Figure 7:
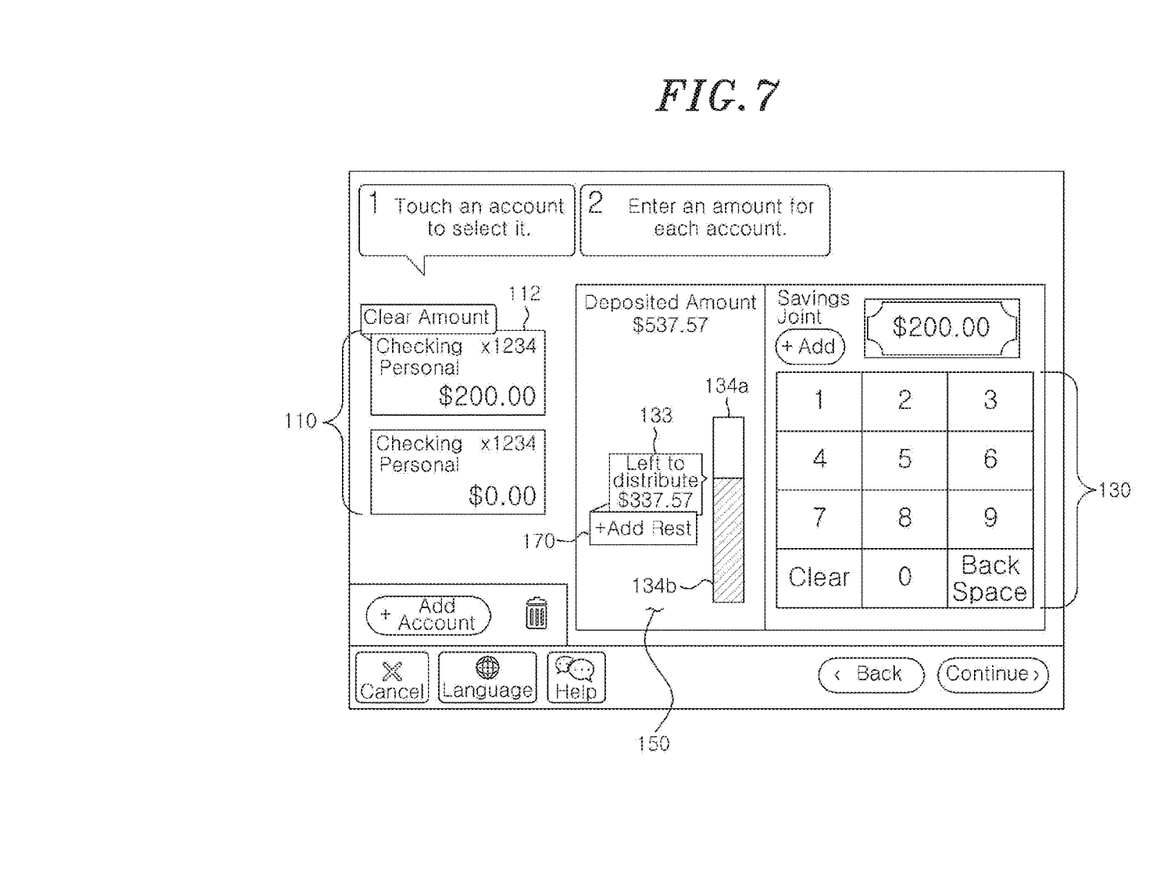

FIG. 7 shows a screen in which the amount to be deposited in the selected account is assigned to the selected account, and the balance that is an amount obtained by subtracting the amount assigned to the selected account from the total amount.

Referring to FIG. 7, the amount $200 to be deposited in the account corresponding to the account display window 112 is assigned to the corresponding account.

The amount display unit 150 displays the total amount to be deposited in the plurality of accounts with areas 134a, 134b, and displays the balance of $337.57 with the shaded area 134b. Therefore, the user may more intuitively recognize the balance.

The amount display unit 150 may further include the balance designation unit 170. The user may use the balance designation unit 170 to designate the current balance to be deposited in a specific account among the plurality of accounts. With this function, the user may deposit the current balance in the specified account without using the amount entry unit 130 for. As shown in FIG. 7, in case the balance of the total amount $537.57 is $337.57 and it is necessary to deposit the balance of $337.57 in a specific account, the user may use the balance designation unit 170 to deposit the balance $337.57 in the specific account. Therefore, the user may conveniently designate the balance as an amount to be deposited.

Figure 8:
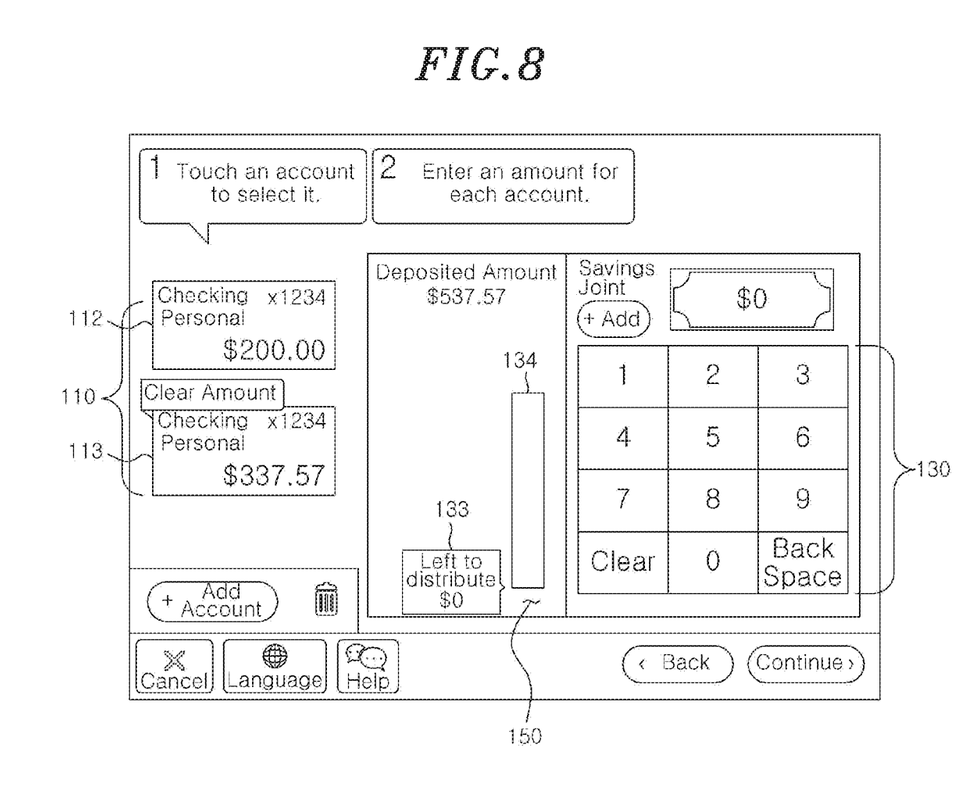

FIG. 8 is an exemplary screen showing that the total amount to be deposited in the plurality of accounts is distributively assigned to each of the accounts.

Referring to FIG. 8, $200 is assigned to the first account 112 and $337.57 to the second account 113 of the account selection unit 110. That is, the total amount to be deposited in the plurality of accounts is distributively assigned to each of the plurality of accounts. Therefore, the balance displayed in the balance display 133 is $0, and the bar 134 has no shaded area which indicates a balance.

As described above, in the process for distributively depositing money in each of a plurality of accounts by using an ATM in accordance with the embodiments of the present disclosure, a user may intuitively recognize an interface using images. In addition, the user may more intuitively recognize the balance that is an amount obtained by subtracting the amount assigned to be deposited in selected account or accounts from the total amount that the user would deposit. In addition, the user may enter the balance as an amount to be deposited more conveniently than conventional manners.

The combinations of respective blocks of block diagrams and respective sequences of a flow diagram attached herein may be carried out by computer program instructions. Since the computer program instructions may be loaded in at least one processor of a general purpose computer, a special purpose computer, or other programmable data processing apparatus, the instructions, carried out by the processor of the computer or other programmable data processing apparatus, create means for performing functions described in the respective blocks of the block diagrams or in the respective sequences of the sequence diagram. Since the computer program instructions, in order to implement functions in specific manner, may be stored in a memory useable or readable by a computer or a computer aiming for other programmable data processing apparatus, the instruction stored in the memory useable or readable by a computer may produce manufacturing items including an instruction means for performing functions described in the respective blocks of the block diagrams and in the respective sequences of the sequence diagram. Since the computer program instructions may be loaded in a computer or other programmable data processing apparatus, instructions, a series of sequences of which is executed in a computer or other programmable data processing apparatus to create processes executed by a computer to operate a computer or other programmable data processing apparatus, may provide operations for executing functions described in the respective blocks of the block diagrams and the respective sequences of the flow diagram.

Moreover, the respective blocks or the respective sequences in the appended drawings may indicate some of modules, segments, or codes including at least one executable instruction for executing a specific logical function(s). In several alternative embodiments, it is noted that the functions described in the blocks or the sequences may run out of order. For example, two consecutive blocks and sequences may be substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications may be made without departing from the scope of the essential characteristics of the embodiments of the present disclosure. Therefore, the exemplary embodiments disclosed herein are not used to limit the technical idea of the present disclosure, but to explain the present disclosure, and the scope of the technical idea of the present disclosure is not limited to these embodiments. Therefore, the scope of protection of the present disclosure should be construed as defined in the following claims and changes, modifications and equivalents that fall within the technical idea of the present disclosure are intended to be embraced by the scope of the claims of the present disclosure.

What is claimed is:

1. A display for an automated teller machine comprising:
   an amount display unit configured to display a total amount of money received from a user;
   an account selection unit configured to allow the user to select an account among a plurality of accounts of the user for distributively depositing the money in the plurality of accounts; and
   an amount entry unit configured to allow the user to set an amount and deposit the amount in the selected account,
   wherein the amount display unit is configured to display a remaining balance of the money received from the user, obtained by subtracting the amount from the total amount,
   wherein the amount display unit is configured to graphically display a ratio of the remaining balance to the total amount by using a figure, and
   wherein the display further comprises:
   a balance designation unit configured to allow the user to deposit all of the remaining balance in another account selected by the account selection unit such that said all of the remaining balance is automatically deposited in said another account by pressing a single button.

2. The display of claim 1, wherein the account selection unit comprises a plurality of account display windows which correspond to the plurality of accounts, respectively, and display information for identifying the plurality of accounts.

3. The display of claim 1, wherein the ratio of the remaining balance to the total amount is indicated by dividing the figure into a first area and a second area, a ratio of the first area to sum of the first area and the second area being equal to the ratio of the remaining balance to the total amount.

4. The display of claim 1, wherein the figure is a bar.

5. The display of claim 1, wherein the plurality of accounts is a plurality of accounts of a same currency type.

6. A method for depositing money in a plurality of accounts using an automated teller machine, the method comprising:
   displaying a total amount of money received from a user;
   allowing a user to select an account among a plurality of accounts of the user for distributively depositing the money in the plurality of accounts;
   allowing the user to set an amount and deposit the amount in the selected account;
   displaying a remaining balance of the money received from the user, obtained by subtracting the amount from the total amount; and
   allowing the user to deposit all of the remaining balance into another account among the plurality of accounts such that said all of the remaining balance is automatically deposited in said another account by pressing a single button,
   wherein in said displaying the balance, a ratio of the balance to the total amount is graphically displayed by using a figure.

7. The method of claim 6, further comprising:
   displaying a plurality of account display windows which correspond to the plurality of accounts, respectively, and display information for identifying the plurality of account.

8. The method of claim 6, wherein the ratio of the balance to the total amount is indicated by dividing the figure into a first area and a second area, a ratio of the first area to sum of the first area and the second area being equal to the ratio of the balance to the total amount.

9. The method of claim 6, wherein the figure is a bar.

10. The method of claim 6, wherein the plurality of accounts is a plurality of accounts of a same currency type.

* * * * *